United States Patent [19]

Hosokawa et al.

[11] Patent Number: 5,307,363
[45] Date of Patent: Apr. 26, 1994

[54] ORGANIC OPTICAL GAIN DEVICE AND METHOD OF EXCITING THE SAME

[75] Inventors: Chishio Hosokawa; Tadashi Kusumoto, both of Sodegaura, Japan

[73] Assignee: Idemitsu Kosan Co., Ltd., Tokyo, Japan

[21] Appl. No.: 34,543

[22] Filed: Mar. 19, 1993

[30] Foreign Application Priority Data

Mar. 26, 1992 [JP] Japan .................................. 4-068677

[51] Int. Cl.$^5$ ............................................... H01S 3/20
[52] U.S. Cl. ....................................................... 372/53
[58] Field of Search .............................. 372/39, 53, 68

[56] References Cited

U.S. PATENT DOCUMENTS

| | | | |
|---|---|---|---|
| 3,679,995 | 7/1972 | Sorokin | 372/53 |
| 3,950,707 | 4/1976 | Hill et al. | 372/9 |
| 5,096,277 | 3/1992 | Kleinerman | 385/27 |

*Primary Examiner*—Rodney B. Bovernick
*Assistant Examiner*—Robert E. Wise
*Attorney, Agent, or Firm*—Oblon, Spivak, McClelland, Maier & Neustadt

[57] ABSTRACT

Disclosed is an optical gain device comprising an active layer having a film thickness of 1 μm or less, 10% or more by weight of fluorescent organic molecules such as stilbene dye, and a quantum yield of fluorescence of 0.1 or more, the device being capable of exciting the active layer and also waveguiding and amplifying the light emitted from the fluorescent organic molecules.

The aforesaid, optical gain device is capable of improving the threshold of excitation intensity as well as the optical gain.

14 Claims, 4 Drawing Sheets

ORGANIC OPTICAL GAIN DEVICE AND METHOD OF EXCITING THE SAME

BACKGROUND OF THE INVENTION

1. Field of the Invention

The present invention relates to an organic optical gain device and a method of exciting the same.

More particularly, it relates to an organic optical gain device which has an improved threshold of excitation intensity, and higher optical gain, and a method of efficiently exciting said device.

2. Description of the Related Arts

Heretofore, ASE (Amplified Spontaneous Emission) device and Laser device provided with a thin film, as the substrate (in the form of sheet or rod), formed by dispersing a slight amount of fluorescent dye into a transparent or noncrystalline polymer such as PMMA (poly(methyl methacrylate)) have been known. Specific embodiments of these devices are disclosed in "Dye Lasers" edited by F. D. Schafer, Topics in Applied Physics Vol. 1, 3rd ed., pp. 82-83 (Springer Verlag) and literatures cited therein.

The above-mentioned devices excited, by $N_2$ laser, a thin film formed by dispersing $8 \times 10^{-3}$ mol/liter of Rhodamine 6 B into a polyurethane sheet at a thickness of 0.8 $\mu$m to realize an optical gain of 100 dB/cm (see Appl. Phys. Lett. reported by H. P. Weber and R. Ulrich, 1971, vol. 19, p.38).

Such a device, however, has a threshold of excitation intensity for ASE light as high as 100 kW/cm$^2$, and has been required for improvement.

If the threshold is lowered, the efficiency of ASE or lasing is improved, and also the optical gain caused by excitation power is increased.

In conventional devices, since the quantum yield of fluorescence of 0.1 or more is obtained only under a condition of dye distribution as dilute as $10^{-3}$ to $10^{-2}$ mol/liter so that inversion distribution is caused, it has been impossible to lower the threshold of excitation intensity. This is because the excitation light is not effectively absorbed through a thin film with a dilute distribution of dye. Also, conventional devices have disadvantages in that gain per unit optical-path is small due to dilute distribution of dye.

Generally, when excitation is caused optically, it is necessary for an excitation light to have an absorption coefficient of $10^4$ cm$^{-1}$ or more to be absorbed completely in an active layer at a thickness of 1 $\mu$m or less. Since the absorption cross section of dye is usually about $10^{16}$ cm$^2$, the layer must contain 10% or more by weight of dye in order to absorb an excitation light completely. Accordingly, conventional dilute dispersion systems have not been able to effectively utilize stripe excitation or spot excitation.

Moreover, formerly, if 10% or more by weight of the conventional fluorescent dye was contained, it caused quenching by aggregation, and the quantum yield of fluorescence decreased drastically, and hence such a device could not be used for ASE elements. Further, when the active layer is an ultra thin film, optical waveguiding is sometimes impossible due to difference in refractive index between two clad layers.

SUMMARY OF THE INVENTION

In these circumstances, the present inventors have repeated intensive study to overcome the above-mentioned disadvantages.

As the result, it has been found that the above problems are solved by stripe or spot excitation of a specified organic ultra thin film which comprises fluorescent dye dispersing in high concentration. The present invention has been accomplished on the basis of such a finding.

That is, the present invention provides an organic optical gain device which comprises an active layer having a film thickness of not more than 1 $\mu$m, 10% or more by weight of fluorescent organic molecules, and a quantum yield of fluorescence of 0.1 or more, said device being capable of exciting the active layer and also waveguiding and amplifying the light emitted from the fluorescent organic molecules.

Further, the present invention provides an organic optical gain device which comprises an active layer having a film thickness of not more than 1 $\mu$m, comprising a fluorescent polymer containing 10% or more by weight of fluorescent organic molecules dispersing therein, and having a quantum yield of fluorescence of 0.1 or more, said device being capable of exciting the active layer and also waveguiding and amplifying the light emitted from the fluorescent organic molecules.

DESCRIPTION OF THE PREFERRED EMBODIMENTS

Figure 1:
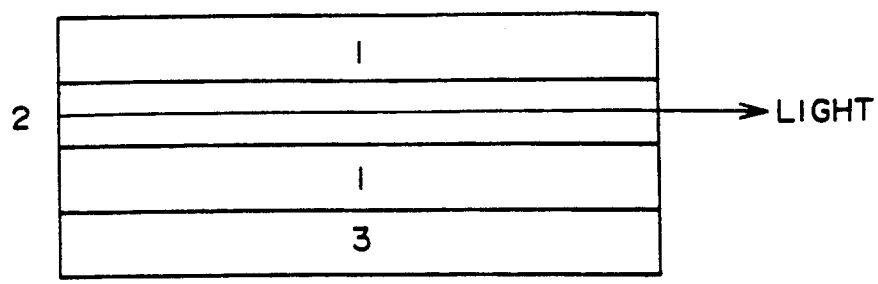
FIG. 1 shows an example of structure of the optical gain device (Structure I)

The organic optical gain device of the present invention has an excitable active layer, and usually comprises the active layer and a substrate.

The active layer to be used in the present invention is capable of accomplishing an inversion distribution of excitation state by stripe excitation or spot excitation, thereby the optical gain device of the present invention can produce an optical gain. This optical gain realizes ASE device, Laser device or optical amplification device.

The active layer is provided with the following properties as essential conditions. First, the film thickness thereof should be not more than 1 $\mu$m, preferably not more than 0.5 $\mu$m. Therein if the film thickness is in excess of 1 $\mu$m, there is caused an inconvenience in that whole the active layer containing fluorescent organic molecules as under-mentioned in a high content of not less than 10% cannot be excited homogenously.

The active layer contains not less than 10% by weight, preferably 30 to 100% by weight of fluorescent organic molecules. If the content of these fluorescent organic molecules are less than 10% by weight, inconveniences as follows are caused. In optical pumping, the excitation light cannot be completely absorbed in the active layer, and accordingly the threshold of the excitation intensity becomes unfavorably high. In electrical pumping, since the electric charge cannot be transported by the active layer, the recombination of holes and electrons cannot be caused, thus the excitation state is not attained.

As the active layer, a fluorescent polymer in which the above-mentioned fluorescent organic molecules are dispersed can be also used.

Further, the quantum yield of the active layer is not less than 0.1, preferably not less than 0.15. If the value is less than 0.1, the excitation power to reach the inversion distribution state increases, and substantially it turns impossible to reach inversion distribution state without destructive damage to the active layer.

In addition, the device of the present invention comprising such an active layer can waveguide and amplify the light emitted from the fluorescent organic molecules or the fluorescent polymer as described above. Accordingly, the device of the present invention contains preferably not less than 10% by weight, particularly preferably not less than 30% by weight of the fluorescent organic molecules, and an excitation part having a quantum yield of fluorescent light of not less than 0.1, and being capable of waveguiding the light emitted from the fluorescent organic molecules.

Examples of above-mentioned fluorescent organic molecules are stilbene dyes, oxazol dyes, oxadiazole dyes, perylene dyes, and polyphenyl dyes. Among them, stilbene dyes are particularly preferred.

Preferable ones of these stilbene dyes are molecules containing, in the molecule, at least one skeleton represented by the general formula (I):

wherein $Ar^1$ and $Ar^2$ each indicate independently a substituted or unsubstituted arylene group having 6 to 25 carbon atoms.

Preferable embodiments of stilbene dyes are distyryl arylene dyes represented by the general formula (II):

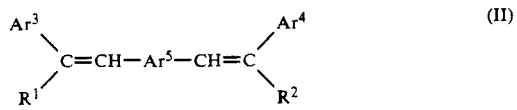

wherein $Ar^3$ and $Ar^4$ each indicate independently a substituted or unsubstituted aryl group having 6 to 25 carbon atoms, and $Ar^5$ indicates a substituted or unsubstituted arylene group having 6 to 25 carbon atoms. $R^1$ and $R^2$ are each independently a hydrogen atom, an alkyl group having 1 to 6 carbon atoms, or a substituted or unsubstituted cyclohexyl group; the substituents include alkyl groups having 1 to 6 carbon atoms, alkoxyl groups having 1 to 6 carbon atoms, aralkyl groups having 6 to 20 carbon atoms, aryloxyl groups having 6 to 20 carbon atoms, cyano groups, amino groups and halogen atoms.

Further preferably stilbene dyes are those represented by the general formula (III):

wherein $Ar^3$, $Ar^4$, $R^1$ and $R^2$ are as defined above.

Examples of the above-mentioned substituted or unsubstituted arylene groups having 6 to 25 carbon atoms include a phenylene group, biphenylene group, terphenylene group, naphthylene group, anthracenylene group, pyrenylene group, perylenylene group, and phenanthrylene group. Examples of the substituted or unsubstituted aryl groups having 6 to 25 carbon atoms include a phenyl group, biphenyl group, terphenyl group, naphthyl group, anthracenyl group, pyrenyl group, perylenyl group, and phenanthryl group. Examples of the alkyl groups having 1 to 6 carbon atoms include a methyl group, an ethyl group, a butyl group, and propylene group, and examples of the alkoxyl groups having 1 to 6 carbon atoms include a methoxyl group, an ethoxyl group, a butoxyl group, and propoxyl groups. Examples of the aralkyl groups having 6 to 20 carbon atoms include benzyl group, and phenethyl group, and examples of the aryloxyl groups having 6 to 20 carbon atoms include a phenoxyl group and tolyloxyl group.

Preferred ones of the above-mentioned amino groups are those represented by:

wherein $Ar^6$ and $Ar^7$ are each independently an alkyl group having 1 to 6 carbon atoms, or a substituted or unsubstituted aryl group having 6 to 25 carbon atoms.

The fluorescent polymers to be preferable active layer are those having 10% or more by weight of fluorescent organic molecules and a quantum yield of the fluorescence of 0.1 or more. Polymer binders are not particularly limited, but transparent resins such as polycarbonate, polyurethane, polystyrene, and PMMA are preferably used. Preferred embodiments of the active layer are copolymers or polymers having the fluorescent organic molecular skeleton as repeating unit in a proportion of 10% or more by weight based on whole the polymer. Specific examples of preferably embodiment of these copolymers or polymers are polycarbonates containing as repeating unit a specific stilbene derivative as described in the specification of Japanese Patent Application No. 51955/1992 and the specification of Japanese Patent Application No. 50865/1992.

Further, the active layer may contain a slight amount (not more than 30% by weight) of other fluorescent molecules as a fluorescent dopant. The emission by the organic optical gain device of the present invention is caused by transfer of an excitation energy to the fluorescent dopant after the above-mentioned fluorescent organic molecules in the active layer is excited. Therein, when the quantum yield of the fluorescent dopant is high, it can contribute to realizing a high quantum yield of the active layer. Such a fluorescent dopant is not particularly limited, but conventionally known ones may be used, and preferred are those having a quantum yield of not less than 0.2 with a small content of the fluorescent dopant in the active layer. Specific examples of these fluorescent dopants are coumarin dyes, xanthene dyes, rhodamine dyes, cyanine dyes, and perylene dyes. These compounds are available from Eastman Kodak Company, Lambda Physik, BASF AG, and Exciton Inc.

Specific fluorescent dopants are coumarin 120, coumarin 2, coumarin 466, coumarin 47, coumarin 102, coumarin 152A, coumarin 152, coumarin 151, coumarin 6H, coumarin 307, coumarin 500, coumarin 314, coumarin 510, coumarin 30, coumarin 334, coumarin 522, coumarin 7, coumarin 6, coumarin 153, DOCI, DMETCI, VRANIN, fluorescein 27, fluorol 7GA, rhodamine 110, rhodamine 19, rhodamine 6G, DQOCI, DCI-2, rhodamine B, sulforhodamine B, malachite green, DTCI, DQTCI, rhodamine 101, DCM, DODCI, sulforhodamine 101, phenoxazone 9, Nile blue, rhodamine 700, pyridine 1, carbazine 122, oxazine 170, oxazine 1, DTDCI, oxazine 750, viridin 2, TIDCI, styryl 6, styryl 8, DDI, and rhodamine 800 (see "Lambdachrome Laser dyes" issued by Lambda Physik 1986). The structures of the organic optical gain device of the present invention are various, but two kinds of structures as follows are mentioned as preferred ones.

In the first structure (Structure I), the organic optical gain device contains a substrate and an active layer as the super structure of the substrate in the device, and the light is waveguided through the active layer, parallel to the surface of the substrate to be amplified (see FIG. 1). This structure may include clad layers (adjacent to the active layer) as the upper layer and the lower layer of the active layer.

Figure 2:
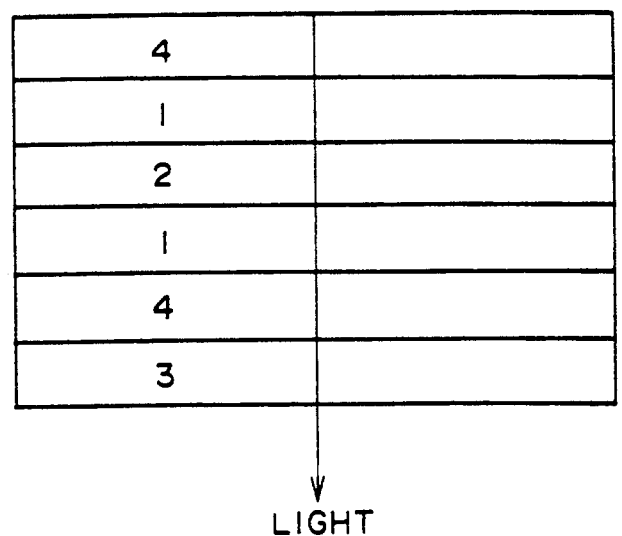
FIG. 2 shows another example of structure of the optical gain device (Structure II), wherein, 1 is a clad layer (excluded in some cases), 2 is an active layer, 3 is a substrate, and 4 is a reflective layer.

In the second structure (Structure II), the organic optical gain device comprises a substrate and an active layer which is the superstructure of the substrate and sandwiched by two reflective mirrors facing each other, and at least one of the reflective mirrors has a reflectivity of 99% or more, and the light is waveguided perpendicularly to the substrate face and the faces of the reflective mirrors as the superstructure to be amplified (see FIG. 2).

In Structure I, the clad layer infers to not only a part of the substrate but also the superstructure with the active layer as the lower layer, and has a reflectivity lower than that of the active layer, and functions to confine the light in the active layer, thereby enable the device to waveguide the light. The first condition for realizing the waveguiding of the light is:

$n_f > n_s$ and $n_f > n_c$ wherein $n_s$ is the reflectivity of the clad layer in the substrate, $n_c$ is the reflectivity of the clad layer (including air) on the active layer, and $n_f$ is the reflectivity of the active layer.

The second condition is that at least one TE mode (that is, $TE_0$) is present. However, even if the above conditions are fulfilled, when the values of $n_f$ and $n_c$ are largely different and the film thickness of the active layer is small, waveguiding may be impossible in some cases due to absence of $TE_0$ mode.

The material for forming said clad layer is not particularly limited, but may be selected from the group consisting of quartz, glass, polymer and combinations thereof, for instance. Preferable example of said material is, one employing quartz plate (refractive index: 1.46), glass plate (NA40, manufactured by HOYA Co., Ltd., refractive index: 1.56) or PMMA plate (refractive index: 1.49) as the substrate, which is provided thereupon with polymer layer or organic low molecular layer having clad function. Material for the polymer layer having clad function is not particularly limited, but fluororesins such as Teflon, PCTFE (polychlorotrifluoroethylene), polyvinyl alcohol resins such as polyvinyl alcohol and polyvinyl butyral, and methacryllic resins such as fluoroinated PMMA and PMMA are mentioned. Alkane metal fluorides such as $MgF_2$, $CaF_2$, and LiF, which are inorganic fluorides, can form clad layers by vapor deposition, CVD (Chemical Vapor Deposition), or sputtering. As the material for the clad layer, the above-mentioned materials for the substrate can be used depending on the material of the active layer.

Further, as the introducing of resonator structure, a Bragg diffraction grating may be provided on the excitation part consisting of the active layer and the substrate. As the photosensitive resin to be used for said Bragg diffraction grating, those having a resolution enough to form a known diffraction grating will suffice.

The upper layer of the active layer in Structure I of the present invention is generally an air layer, but may be a clad layer having a refractive index lower than that of the active layer.

As the material for the clad layer to be used therein, those described before will suffice. In addition, a Bragg diffraction grating or an electrode for electrical pumping may be installed. The preferred device of the present invention having Structure I contains an active layer having the above-mentioned properties, but usually consisting of an excited part comprising clad layer/active layer, substrate/clad layer/active layer or substrate/clad layer/active layer/clad layer.

Structure II also may contain a clad layer as shown in FIG. 2. Unlike the clad layer of Structure I, the clad layer of Structure II requires no limitation on refractive index. Accordingly, the clad layer, that is the element of Structure II may comprise materials which do not remarkably absorb the light optically waveguided. Examples of the materials for said clad layer are air, transparent polymer (such as PMMA, polycarbonate, polystyrene, fluororesin, and polyvinyl alcohol resins), transparent inorganic material such as inorganic alkali metal fluoride, metal oxides (such as ITO, ZnO, $SnO_2$, and $TiO_2$), wide gap semiconductors (that is, semiconductors with 2eV or more of band gap, such as ZnS, ZnSe, ZnO, CdS, CdSe, GaN, InGaN, SiC, and ZnCdSe) and amorphous transparent organic low molecular films.

In Structure II, preferred reflective mirror is a film of an arbitrary metal (that is, Al, Mg, Ag, Cr or an alloy thereof) having a reflectivity of 99% or more, and particularly preferred is a dielectric multi-layer mirror having a reflectivity of 99% or more.

Said dielectric multi-layer mirror is a multi-layer mirror comprising high refractive dielectric layers and low refractive dielectric layers alternately superposed on each other, in which each of these layers have an optical film thickness of $\lambda/4$ wherein $\lambda$ is the wavelength of light wave-guided.

Therein, typical materials of the high refractive dielectric layer are $MgO_2$, $TiO_2$, ZnSe, ZnS and the like, and the typical materials of low refractive dielectric layer are $SiO_2$, $MgF_2$, $ThF_2$ and the like (see Laser Handbook, the OHM-Sha, Ltd., compiled by Laser Society in Japan, 1982, p410).

When the excitation means is light in Structure II, one of the reflective mirrors is the above-mentioned dielectric multi-layer mirror, and it is preferred that at least one of the reflective mirrors transmits 50% or more of the excitation light. The dielectric multi-layer mirror to be used there transmits the excitation light, but is capable of reflecting the waveguided light.

On the part of such an dielectric multi-layer mirror in contact with clad layer or active layer electrodes for electrical pumping for the purpose of using electricity as an excitation means may be provided, and 99% or more of reflectivity can be retained even if transparent electrodes such as ITO, $SnO_2$:Sb (mixed electrode), and ZnO:Al (mixed electrode) are provided.

Moreover, the reflective mirror itself using the above-mentioned metal film can be used as the electrode for electrical pumping. Accordingly, for example, it is possible to provide the device having Structure II with a means for electrical pumping, having ITO and the like as the anode, and a Mg-based alloy as the cathode.

For excitation of the optical gain device of the present invention, the stripe excitation method and the spot excitation method can be used. The applicable stripe or spot excitation method includes the optical pumping method, the electrical pumping method, and the electron beam pumping method, among which the optical pumping method and the electrical pumping method are preferred, and particularly preferred is the optical pumping method.

Therein, the optical pumping is effected by ultraviolet rays absorbable by the fluorescent organic molecules and/or by the fluorescent polymer. Particularly, ultraviolet laser rays such as $N_2$ laser, excimer laser, and argon laser are preferred.

The shape of the excitation light of the stripe excitation in said optical pumping method is preferably a stripe so as to give gain in one direction in the device of Structure I, and specifically preferred shape is a stripe of (1 mm to 30 mm)×(1 $\mu$m to 1000 $\mu$m), and particularly preferred shape is a stripe of (1 mm to 10 mm)×(1 $\mu$m to 100 $\mu$m).

The shape of the excitation light of the spot pumping is preferably a circle with a radius of not more than 1 mm, or an ellipse with a line of apsides of not more than 2 mm.

The power of the excitation light is preferably 10 kW/$cm^2$ or more, and particularly preferably 30 kW/cm or more. Excitation by pulse laser light of 10 MW/$cm^2$ or more (pulse width: 1 ns or more) is unfavorable since it optically impairs the active layer. However, a PS (picosecond) laser light enables excitation up to 1 GW/$cm^2$.

On the other hand, as the devices to which the electron beam pumping method are effective to bring optical gains, conventionally known are those containing inorganic crystals such as ZnS, ZnSe, ZnO and the like in the active layer. Of course, these methods can be applied also to the present invention.

Next, the method of producing organic optical gain device of the present invention will be described on the basis of the above-mentioned examples of structure.

(1) Structure I (clad layer/active layer)

First, a substrate (having clad function) is washed with a known detergent, isopropanol or the like (removing organic carbon by UV ozone washing method is included) and dried.

Next, an active layer is formed on the substrate which is also the clad layer. When the active layer comprises fluorescent organic molecules, preferably method of forming a film is the vapor deposition method, and the preferable conditions therefor include a temperature of the deposition source of 200° to 400° C., a deposition rate of 0.1 to 0.5 nm/sec., a substrate temperature of 70° to 100° C., and a resulting film thickness of 10 nm to 100 nm. What is to be noted is that vapor deposition should be effected at such a temperature that the fluorescent organic molecules dispersed in the active layer are not decomposed.

The method of producing a film when the active layer comprises fluorescent polymer includes the spin-coating method, the coating method, and the casting method. Among them, the spin-coating method is particularly preferable. Therein, it is necessary to select a binder that has an excellent flattening property enough to realize a flatness of ±20 nm or less and also a solvent to be used. When the binder is polycarbonate, preferable solvents are halogen-based solvent, toluene, xylene, and benzene. Particularly preferable solvent is dichloroethane or dichloromethane. The dispersing concentration of the fluorescent organic molecules to be dispersed in the active layer is not less than 10% by weight, preferably not less than 30% by weight.

The resulting film thickness is 10 nm to 100 nm, preferably not more than 1 $\mu$m. When the film thickness is 1 $\mu$m or less, the excitation light can be absorbed favorably.

The resulting organic optical gain device comprising a substrate/active layer is dried and baked at 100° C. or lower for about an hour, thereby the organic optical gain device of the present invention can be obtained.

(2) Structure I (substrate/clad layer/active layer)

First, the substrate is washed and dried in the same manner as in (1).

Next, a clad layer is formed on the substrate. When the clad layer comprises polymer, the applicable method of forming film includes the spin-coating method, the coating method, and the casting method. Among them, particularly preferred method is the spin-coating method. In this method, a solvent and revolution conditions to realize a flatness of ±40 nm or less should be selected so that the film is formed at a thickness of 30 nm to 600 nm. Moreover, it should be noted that the clad layer must not be melted by the spin coating at the time of forming the active layer. Therein, spin coating is preferably performed using a solution of polyvinyl butyral in alcohol-based solvent or an aqueous solution of polyvinyl alcohol. Particularly preferable insoluble clad layer is that formed by the use of a ultraviolet hardened resin or thermosetting resin each having a low refractive index.

Subsequently, an active layer is formed on the resulting clad layer in the same manner as in the production of device (1), and after drying and baking, the organic optical gain device of the present invention can be obtained.

(3) Structure I (substrate/clad layer/active layer/clad layer)

The substrate, the clad layer, and the active layer can be formed in the same manner as in the above-described (1) and (2). In forming the clad layer on the active layer, however, attention should be paid so that the active layer may not melt by spin coating. Therein, spin coating is preferably performed using a solution of polyvinyl butyral in alcohol-based solvent or an aqueous solution of polyvinyl alcohol.

(4) Structure II (substrate/dielectric multi-layer mirror/active layer/dielectric multi-layer mirror/glass layer)

A dielectric multi-layer mirror is formed on the substrate. To form the dielectric multi-layer mirror, a known transparent dielectric substance such as ZnS, ZnSe, $TiO_2$, and $Al_2O_3$ is selected as the dielectrics, and formed into a film so that high refractivity layers and low refractivity layers are laminated alternately, in which each of these layers have optical film thickness of ($\lambda$ (wavelength to be amplified by waveguiding)/4). To produce the film, the vapor deposition method, the ion plating method, the sputtering method, and the CDV method can be used. Subsequently, the active layer and the dielectric multi-layer mirror are formed in the same manner as in (1) above, and finally the device is formed by bringing the laminated layers into close contact with a glass plate as the glass layer.

Also, after the active layer is formed, a dielectric multi-layer mirror is formed on the glass plate to be compressed on the active layer, thereby a device can be formed. Therein, even if air penetrates between the active layer and the dielectric multi-layer mirror to form an air layer, the function of the device is never affected.

(5) Structure II (substrate/dielectric multi-layer mirror/active layer/clad layer/reflective mirror)

Substrate/dielectric multi-layer mirror/active layer is formed in the same manner as in the production of the device of the above-described (4) and then a layer comprising an arbitrary transparent material is formed as the clad layer. The transparent material is preferably formed into film by the vapor deposition method, the ion plating method, the sputtering method or the spin-coating method. Further, a metal film having a high reflectivity is formed as the reflective mirror by the above-mentioned method of forming film. In this structure, the net optical film thickness of active layer/clad layer is preferably adjusted to an integral multiple of $\frac{1}{2}$ of $\lambda$.

The organic optical gain device of the present invention has enabled to increase the optical gain by steeply lowering the threshold of light excitation.

Accordingly, the organic optical gain device of the present invention enables to confine light by various waveguiding construction to cause inversion distribution, thereby optical gain can be obtained. Consequently, the organic optical gain device of the present invention enables lasering by an organic ultra thin film, and can be effectively utilized for blue laser, light amplifier and the like. Further, said device can be effectively utilized for blue lasering by electrical pumping.

The present invention will be described in further detail with reference to examples and comparative examples as follows.

EXAMPLE 1 (Formation of Excited Part in Structure I)

Optically ground quartz substrate of 25 mm×75 mm×1 mm (manufactured by HOYA Co., Ltd.) was ultrasonically washed in isopropyl alcohol for 5 minutes. Further, dried helium was blown on to the substrate, which was dried and washed for 10 minutes with a UV ozone washer (UV 300, manufactured by Samco International Inc.) The substrate was set on the substrate holder of the spin coater, and a dichloromethane solution containing 1% by weight of 4,4'-bis(2,2-diphenylvinyl)biphenyl (DPVBi) that is a stilbene-based dye, and 1% by weight of polycarbonate (PCZ, Z-200, produced by Mitsubishi Gas Chemical Co., Ltd.) was developed onto the substrate, and the spin coater was revolved for 80 seconds at 1000 rpm to perform spin coating. The film thickness of the thin film obtained was 250±20 nm (measured by probe-type film thickness meter DEKTAK3030, manufactured by Sloan Co.), and the color tone was transparent.

Further, as the result of determination of the transmittance of a $N_2$ laser light with a wavelength of 337 nm, it was confirmed that 96% of the light was absorbed, which proved that the excitation light was efficiently absorbed by the high concentration dispersion (50% by weight).

As the result of a measurement by an elipsometer, the refractive index of the quartz was 1.44, and that of DPVBi:PCZ layer was 1.64, which satisfied the conditions of the refractive index for waveguiding. An analysis of waveguiding path structure showed that $TE_0$ mode was waveguided.

The quantum yield of DPVBi:PCZ layer was 0.25 as measured by means of an laser light (1 kW/cm$^2$) with the quantum yield of 0.98 of Violet 570 (produced by BASF Co.) in $CCl_3H$ as the standard.

EXAMPLE 2 (Measurement of ASE Light)

On the excitation part as obtained in Example 1, $N_2$ laser light (3 mm×8 mm) was irradiated as a stripe excitation light of 300 μm×8 mm through a cylindrical lens (f:11 cm, made of quartz). The excitation power in that radiation was 150 kW/cm$^2$.

Figure 3:
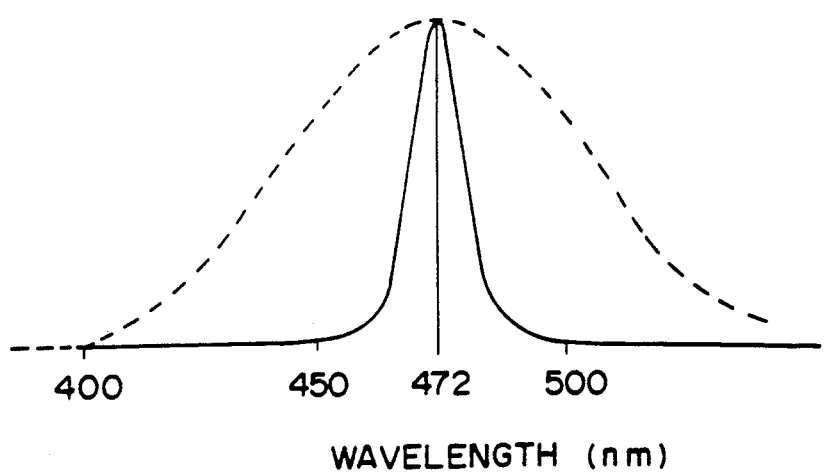
FIG. 3 shows a spectrum observed by multi-channel diodes by guiding ASE from an organic optical gain device as obtained in Example 2 to quartz fiber.

Therein, it was clearly confirmed that ASE light was emitted in one direction. The light was waveguided, and the spectrum obtained by a multi-channel diode is shown in FIG. 3. The dotted line in FIG. 3 indicates the fluorescent spectrum of DPVBi:PCZ layer, which certifies that the spectrum width of ASE light is very narrow compared to the fluorescent spectrum. It shows that the active layer came to be in the state of inversion distribution of excitation by the excitation light and, as the result, possesses an optical gain. Moreover, it is proved that the fluorescence is amplified at a wave length range with largest gain, and was emitted with a directionality.

EXAMPLE 3 (Measurement of Excitation Threshold of ASE Light)

Figure 4:
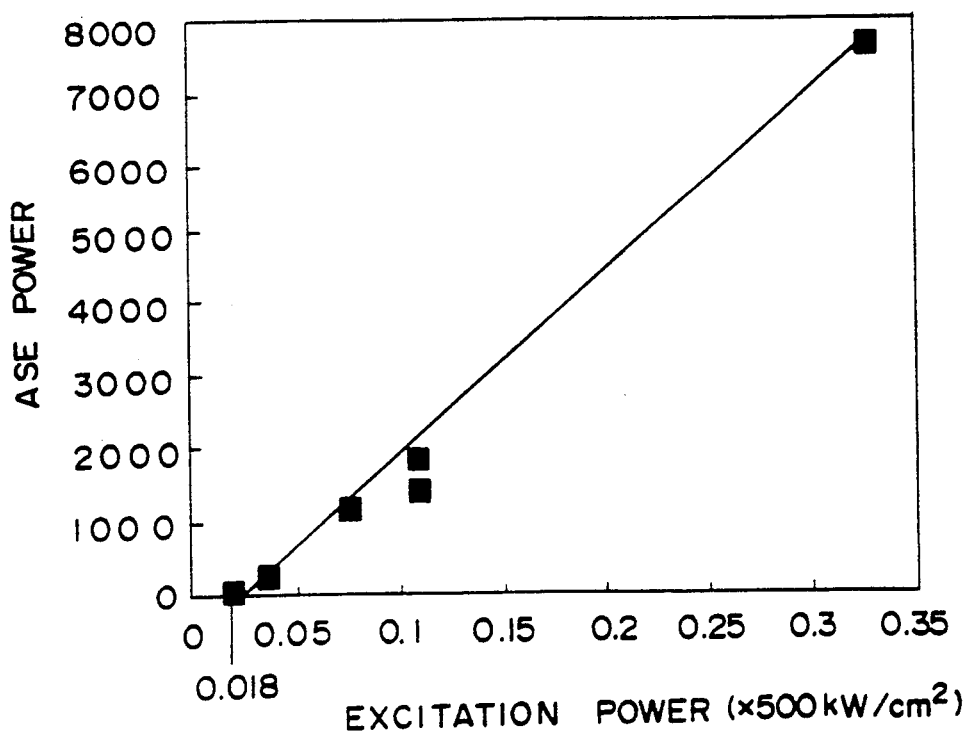
FIG. 4 shows the relations between the excitation power and ASE power as obtained in Example 3.

$N_2$ laser light was attenuated with a filter (optical flar glass) to vary the excitation power, while ASE power (arbitrary unit) was measured. The result is given in FIG. 4. The threshold for emission of ASE light is 9 kW/cm$^2$, which corresponds to about 1/10 of that in conventional art. Consequently, it is clear that the optical gain thereof is far larger than that of the conventional art.

Figure 5:
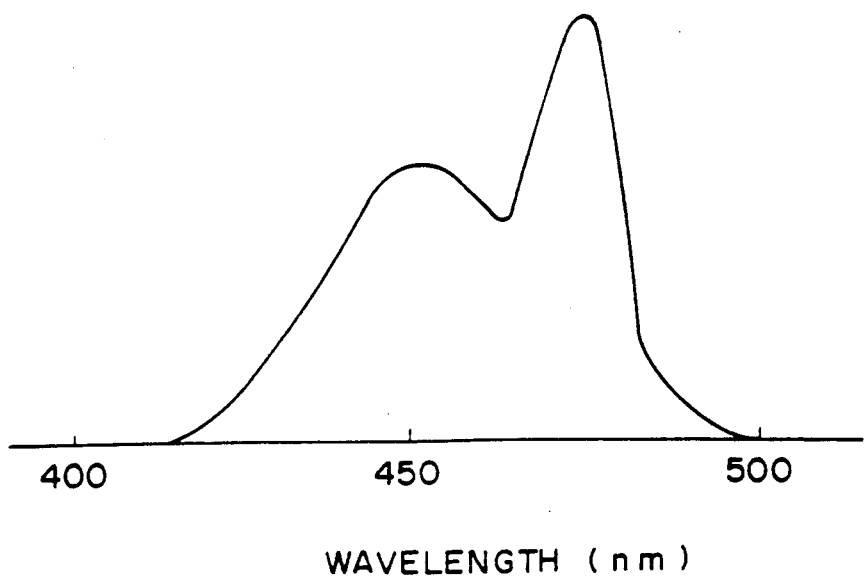
FIG. 5 shows a spectrum obtained by multi-channel diodes by guiding ASE from an organic optical gain device as obtained in Example 3 to quartz fiber.

The spectrum obtained from the emitted light at threshold in the same manner as in Example 2 is given in FIG. 5. It is confirmed that the peak of ASE light appears on the side of longer wavelength in FIG. 5.

EXAMPLES 4 to 7

The procedure of Example 1 was repeated to form a thin film except that the revolution per minute of the spin coater were as shown in Table 1, thereby the transparency was measured. The result is given in Table 1, which demonstrates that about 80% or more of the excitation light can be absorbed in spite of such an ultra thin film. It was realized as the result of dispersing the fluorescent organic molecules in a high concentration of 10% by weight or more.

tABLE 1

| Examples | Revolution number (rpm) | Film thickness (nm) | Transmittance (%) |
|---|---|---|---|
| 4 | 1000 | 190 | 8.0 |
| 5 | 2000 | 155 | 15 |
| 6 | 4000 | 135 | 21 |
| 7 | 5000 | 120 | 20 |

EXAMPLE 8

The procedure of Example 1 was repeated to produce a thin film, and to measure the transmittance except that the substrate was initially provided with a clad layer consisting of polyvinyl alcohol.

The substrate was subjected to spin coating by revolving a spin coater at 8000 rpm using 2% by weight aqueous solution of polyvinyl alcohol. The film thickness of the resulting thin film was 450±10 nm. As the result of measurement by elipso meter, the refractive index of the thin film was 1.48, which elucidated that the film is applicable as a clad layer.

On the clad layer, an active layer was provided in the same manner as in Example 1, and excitation light was irradiated thereon. The threshold at the generation of ASE light was 7 kW/cm$^2$, and the peak wavelength of ASE light was 474 nm.

EXAMPLE 9

An optically ground quartz substrate of 25 mm×75 mm×1 mm (manufactured by HOYA Co., Ltd.) was ultrasonically washed in isopropyl alcohol for 5 minutes. Further, dried helium was blown onto the substrate to dry the same, which was washed with a UV ozone washer (UV300: manufactured by Samco International Co.) for 10 minutes. The substrate was set on a substrate holder of the spin coater, and microposit (MP1300-31, photoresist produced by SHIPLEY FAREAST LTD.) was developed on the substrate, and the substrate was subjected to spin coating by revolving the spin coater at 5000 rpm for 60 seconds. The resulting thin film was prebaked at 95° C. for 30 minutes.

Subsequently, argon laser with 351 nm line was divided in two, and allowed to interfere with each other to make an exposure in grating form, thereby holographic exposure was conducted. After that, one end of the resulting exposed material was dipped in a developer (microposit developer), washed with ion-exchanged water, and then subjected to postbaking at 120° C. for 3 minutes. Thus a photoresist pattern (grating form) with a period of 310 nm was obtained.

Figure 6:
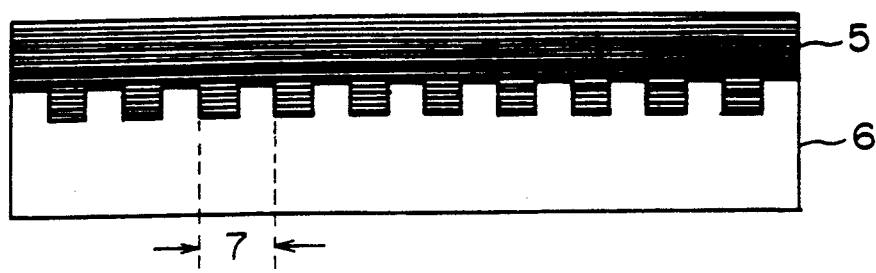
FIG. 6 shows the cross sectional view of the excitation part as obtained in Example 9, wherein, 5 is an active layer, 6 is a substrate, and 7 indicates 310 nm.

Subsequently, Cr and Au were vapor deposited successively with thicknesses of 20 nm and 200 nm, respectively on the substrate. After treatment with a UV/O$_3$ washer at a substrate temperature of 120° C. for one hour, the photoresist was peeled off, and the substrate was dipped in 5% dilute solution of hydrogen fluoride for 50 seconds, thus the part of the substrate, from which the photoresist was peeled off, was subjected to etching. Then, the substrate was dipped in dilute aqua regia to dissolve Cr and Au, and a substrate having the grating as shown in FIG. 6 was produced.

By the use of the resulting substrate, an active layer was produced in the same manner as in Example 1. The resulting excitation part is shown in FIG. 6, wherein the glating unit of 310 nm satified the conditions of Bragg diffraction at a wavelength of the waveguiding light of 470 nm.

As the result of stripe excitation by N$_2$ laser light in the same manner as in Example 2, a peak wavelength of 471 nm with a narrow peak width of 2 nm was obtained due to the effect of Bragg diffraction grating as the oscilator. The threshold for lasing was 2 kW/cm$^2$.

EXAMPLE 10 (Example Using Mixture of Fluorescent Molecules as the Active Layer)

The procedure of Example 1 was repeated to form an excitation part and evaluate the same except that the combination of DPVBi and DPAVBi shown below (ratio by weight: 4:1) was used in place of DPVBi.

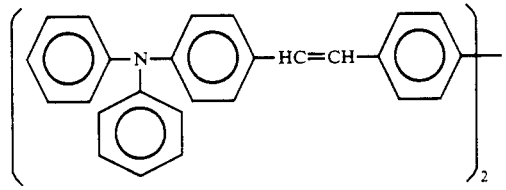

The threshold for ASE light was 20 kW/cm$^2$, the peak wavelength of ASE light was 467 nm, and the peak half-value width was 7 nm.

Further, as the result of measurement with an elipsometer, the refractive index was 1.61, which satisfied the condition of refractive index for waveguiding.

The quantum yield of DPVBi:DPAVBi deposition film was 0.27 as measured by means of a laser light (1 kW/cm$^2$) with the quantum yield of 0.98 of Violet 570 (produced by BASF AG.) in CCl$_3$H as the standard.

EXAMPLE 11 (Example Using Deposition Film as the Active Layer)

200 mg of DPVBi and 200 mg of DPAVBi were placed in two electrically heated boats respectively, which were connected to electrical terminals. Subsequently, the pressure of a deposition tank was controlled to 10$^{-4}$ Pa, and the above boats were simultaneously heated, thereby codeposition was conducted. The deposition rate was 8 to 10 Å/sec for DPVBi, and 2 Å/sec for DPAVBi. The film thickness obtained was 120 nm each.

As the result of stripe exciting by neon laser light in the same manner as in Example 2, the threshold for ASE light was 10 kW/cm$^2$, the peak wavelength of ASE light was 492 nm, and the full width at half maximum of the peak was 7 nm.

The quantum yield of DPVBi/DPAVBi deposition film was 0.2 as measured by means of a laser light (1 kW/cm$^2$) with the quantim yield of 0.98 of Violet 570 (produced by BASF AG.) in CCl$_3$H 0.98 as the standard.

COMPARATIVE EXAMPLE 1

The procedure of Example 11 was repeated to produce a deposition film with a film thickness of 120 nm except that Al(Ox)$_3$ shown below was used in place of DPVBi and DPAVBi.

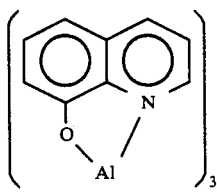

As the result of stripe excitation by N$_2$ laser light according to the procedure in Example 2 up to the intensity of 500 kW/cm$^2$, no ASE light was emitted.

The quantum yield of Al(Ox)$_3$ was 0.07 as measured under an excited laser light (1 kW/cm$^2$) with the quantum yield of 0.98 of violet 570 (produced by BASF AG.) in CCl$_3$H as the standard.

COMPARATIVE EXAMPLE 2

The procedure of Example 1 was repeated to produce an excitation part and evaluate the same except that 10% by weight of rhodamine B was added into PCZ.

As the result of stripe excitation by N$_2$ laser light in the same manner as in Example 2, no ASE light was emitted. The fluorescence of the thin film of PCZ/rhodamine B was extremely poor. In this thin film, dye aggregation caused fluorescence quenching.

EXAMPLE 12 (Production of the Structure II)

A dielectric multi-layer mirror having a reflectivity of 99.5% or more in a wavelength range of 490 to 540 nm (manufactured by Howa Sangyo) was obtained. The film thickness of the synthesized quartz plate as the substrate of said dielectric multi-layer film mirror was 1 cm. Said reflective mirror transmitted 90% or more of laser light of 337 mm as the excitation light.

On the reflective mirror, an active layer with a film thickness of 300 nm was formed in the same manner as in Example 1 except that 4,4'-bis(2,2-phenyl-biphenyl-vinyl)benzene (PBVB) was used as the fluorescent organic molecule. However, the film had roughness of ±20 nm on the surface. As the result of compressing the same dielectic multi-layer mirror as the above on the active layer obtained, the space between the reflective mirrors became larger than the film thickness of 300 nm of the active layer.

EXAMPLE 13 (Lasing by the Device of Example 12)

On the device obtained as in Example 12, N$_2$ laser light (3 mm×8 mm) was focused with a convex lens (f=7 cm), and irradiated in the form of spot excitation light of 2 mm in diameter.

The excitation power of the spot excitation light was 300 kW/cm$^2$. It was confirmed that lasing occurred in the direction perpendicular to the reflective mirror.

Figure 7:
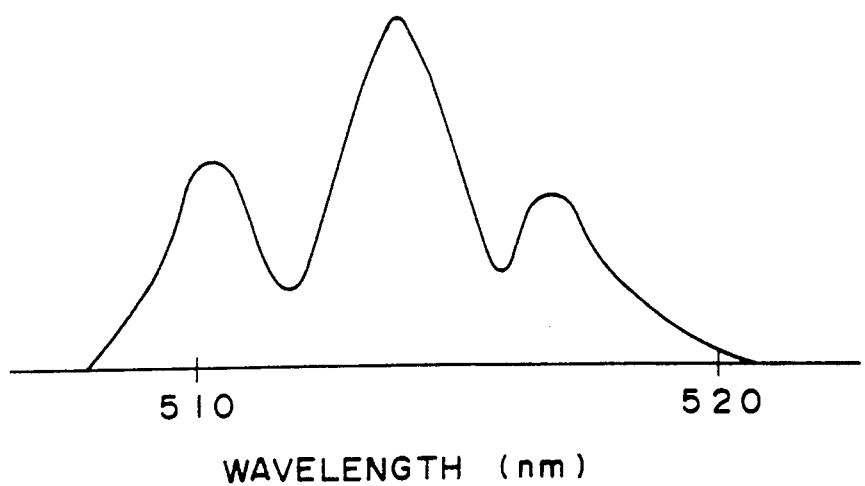
FIG. 7 shows a spectrum obtained by the multi-channel diodes obtained in Example 13.

The spectrum of laser emission measured by using a multi-channel diode is given in FIG. 7. Three line spectra of lasing can be confirmed by FIG. 7, in which each line spectrum is as steep and 3 nm of full width at half maximum, showing that it is monochromatic light derived from lasing.

In the present device, light travels in the direction perpendicular to the surface of the active layer and gets amplified. Accordingly, it has been made clear that the device of the present invention has an optical gain even in a lightguide path of a very short distance of 300 nm (film thickness), proving that the large amount of fluorescent molecules in the active layer brings a very large optical gain.

EXAMPLE 14 (Example of Doping in the Active Layer)

The procedure of Example 12 was repeated to prepare an active layer and a device except that 0.5% by weight of coumarin 314 was mixed in the active layer.

EXAMPLE 15 (Lasing by the Device of Example 14)

N$_2$ laser light was focused through a convex lens in the same manner as in Example 13 on the device as obtained in Example 14. Therein excitation power was adjusted to 3 kW/cm$^2$ with ND filter for UV. In the case where the excitation power was 3 kW/cm$^2$, laser emission was obtained.

What is claimed is:

1. An organic optical gain device which comprises an active layer having a film thickness of 1 μm or less, 10% or more by weight of fluorescent organic molecules, and a quantum yield of fluorescence of 0.1 or more, said device being capable of exciting the active layer, and also waveguiding and amplifying the light emitted from the fluorescent organic molecules.

2. The organic optical gain device according to claim 1, wherein the fluorescent organic molecules are those of stilbene dye.

3. The organic optical gain device according to claim 1, wherein an excitation part comprising a substrate/a clad layer/an active layer or a substrate/a clad layer/an active layer/a clad layer is contained in said device and the light is waveguided parallel to the substrate.

4. The organic optical gain device according to claim 1, wherein an excitation part comprising a reflective mirror/an active layer/a reflective mirror is contained in said device, at least one of said reflective mirrors has a refractive index of 99% or more, and the light is waveguided perpendicularly to the reflective mirrors.

5. The organic optical gain device according to claim 4, wherein the reflective mirror comprises multi-layer film of a dielectric.

6. A method of exciting an organic optical gain device which comprises stripe excitation of the optical gain device according to claim 1.

7. A method of exciting an organic optical gain device which comprises spot excitation of the optical gain device according to claim 1.

8. An organic optical gain device which comprises an active layer having a film thickness of 1 μm or less, comprising a fluorescent polymer containing 10% or more by weight of fluorescent organic molecules dispersed therein, and having a quantum yield of fluorescence of 0.1 or more, said device being capable of exciting the active layer, and also waveguiding and amplifying the light emitted from the fluorescent organic molecules.

9. The organic optical gain device according to claim 8, wherein the fluorescent organic molecules are those of stilbene dye.

10. The organic optical gain device according of claim 8, wherein an excitation part comprising a substrate/a clad layer/an active layer or a substrate/a clad layer/an active layer/a clad layer is contained in said device and the light is waveguided parallel to the substrate.

11. The organic optical gain device according to claim 8, wherein an excitation part comprising a reflective mirror/an active layer/a reflective mirror is contained in said device, at least one of said reflective mirrors has a refractive index of 99% or more, and the light is waveguided perpendicularly to the reflective mirrors.

12. The organic optical gain device according to claim 11, wherein the reflective mirror comprises multilayer film of a dielectric.

13. A method of exciting an organic optical gain device which comprises stripe excitation of the optical gain device according to claim 8.

14. A method of exciting an organic optical gain device which comprises spot excitation of the optical gain device according to claim 8.

* * * * *